Sept. 24, 1957 L. E. STEIN 2,807,513
CAR TRAY
Filed March 24, 1955

INVENTOR.
Louis E. Stein.
BY
*Fishburn & Mullendore*
ATTORNEYS.

United States Patent Office 2,807,513
Patented Sept. 24, 1957

2,807,513
CAR TRAY
Louis E. Stein, Parsons, Kans.

Application March 24, 1955, Serial No. 496,533

1 Claim. (Cl. 311—22)

This invention relates to trays, and more particularly to trays adapted for use in connection with windows of automobiles and the like in drive-in places, theatres and eating places.

Heretofore trays for use in connection with automobiles have been of the type which were attached to the door of the car and had a brace or the like which engaged against the outside of the car door to hold the tray in a horizontal position. The tray usually had a hook of some sort to engage over the door when the window was open or in the recess between the inside and outside of the door to hold the tray thereon.

It is the principal object of the present invention to provide a tray having a hook member for engaging over the sliding glass part of the door and having arms which engage alongside the glass to hold the body of the tray in horizontal position and the window glass raised and lowered as desired while the tray is attached thereto.

Other objects of the invention are to provide a tray made of wire material; to provide legs on the rear portion of the tray which are of substantially the same length as the arms of the hook member so that the tray may be placed on a plane surface without tipping; to provide a tray adapted to be used either on the outside or inside of the automobile; to provide a tray which will seat on the cushion of the seat of the automobile; to provide means for securing the tray to a standard or post in a drive-in theatre so the tray will not be carried away inadvertently; and to provide a device of this character, simple and economical to manufacture.

In accomplishing these and other objects of the present invention, I have provided improved details of structure the preferred forms of which are illustrated in the accompanying drawings, wherein.

Figure 1:
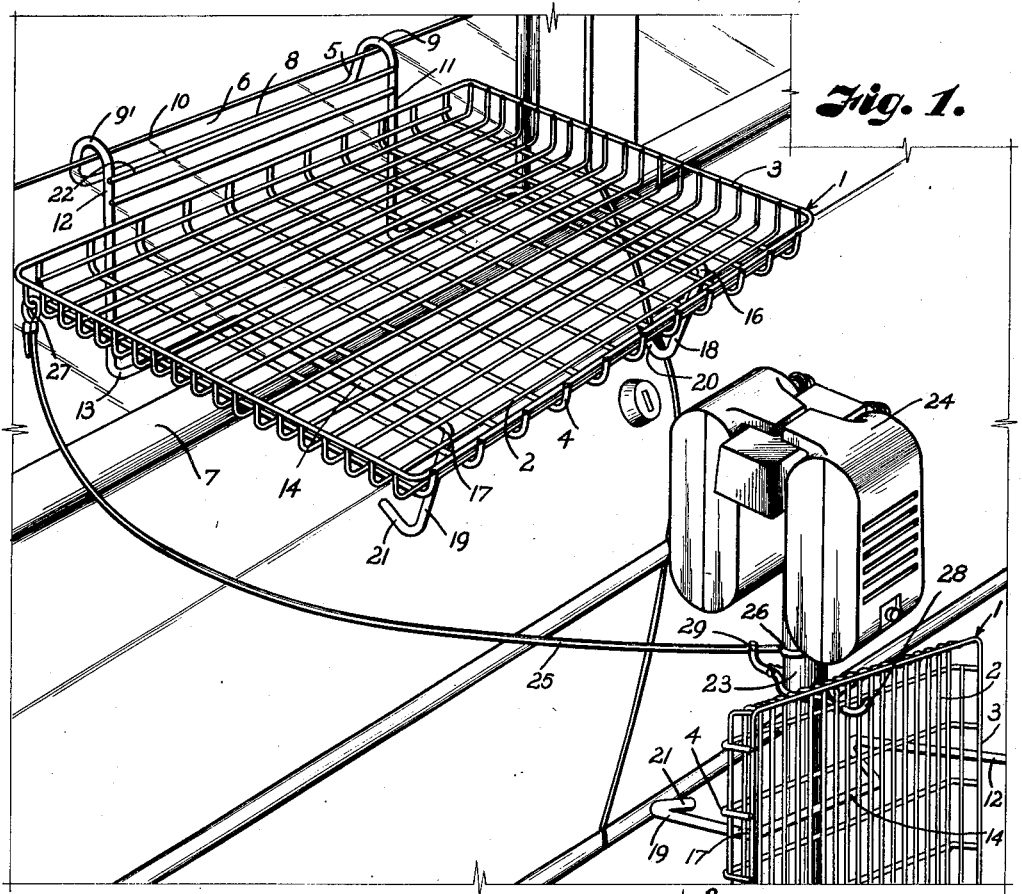
Fig. 1 is a perspective view of my invention shown attached to a post of a microphone stand in a drive-in theatre or the like, with the tray itself attached to the glass door of the automobile.
Figure 2:
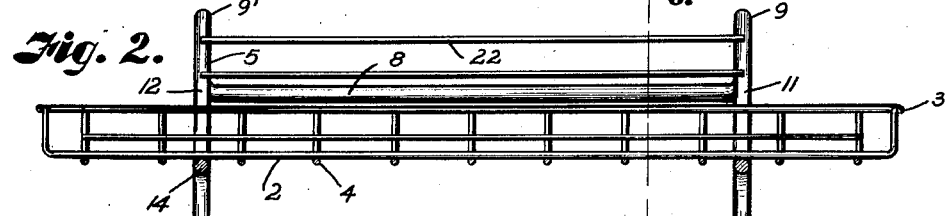
Fig. 2 is a rear end view of another form of the tray.

Referring more in detail to the drawings:

1 designates a tray embodying the features of my invention of generally rectangular shape and comprising a plurality of wires 2 bent upwardly at their ends with a wire 3 around the upper edge of the wires 2 and welded or otherwise suitably secured thereto. Cross wires 4 are provided and also welded or otherwise secured to the wires 2 and also to the wire rim 3 to form the container like tray 1.

Figure 3:
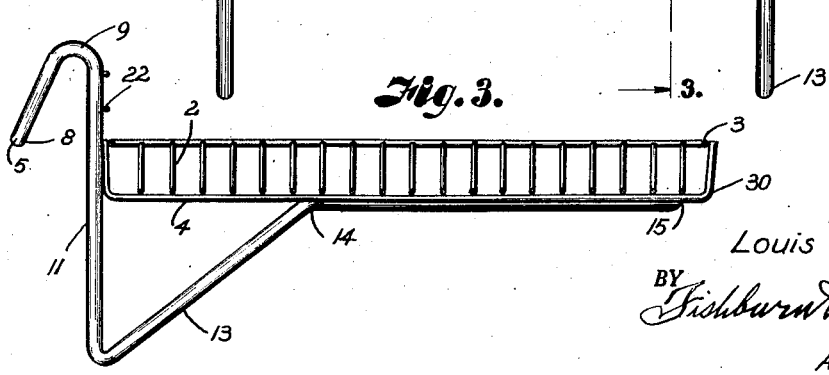
Fig. 3 is a sectional view through the tray taken on a line 3—3, Fig. 2.

In the invention shown in Fig. 3, the hook member 5 is provided for engaging over the glass 6 of the door 7 of an automobile or the like and which may be raised and lowered as desired by the crank on the door as is the usual practice. The tray may be used either on the outside or inside of the car as desired.

The hook 5 comprises a cross member 8 turned to form loops 9 and 9′ which engage the edge 10 of the glass and then the rod is turned downwardly forming arms 11 and 12 which engage the side of the glass to hold the tray in horizontal position. The arms 11 and 12 are then turned at an angle as indicated at 13, Fig. 3, and then laterally as indicated at 14 to run along the underneath side of the tray and are welded or otherwise secured to the wires. The ends terminate as indicated at 15 short of the edge of the tray as shown in Fig. 3.

With the form shown in Fig. 1 the rods 11 and 12 continue and are turned vertically downwardly as indicated at 16 and 17 forming legs 18 and 19, then turned inwardly as indicated at 20 and 21 to engage the surfaces of a table or other support when the device is used disconnected from the automobile so that the bottom of the tray will remain in a horizontal position. Cross wires 22 are provided for connecting the arms 11 and 12 to lend rigidity to the structure.

23 designates a post or standard for microphones 24 used in drive-in theatres and a chain or the like 25 is secured thereto as indicated at 26 and has its opposite ends secured to the tray as indicated at 27 for attaching the tray to the posts so that it may not inadvertently be carried away. The wire tray and chain may be covered with a plastic material resistant to heat, acid and stains and for easy cleaning and preventing of corrosion. Hooks 28 and 29 are provided on the standard as illustrated in Fig. 1 for hanging the tray to the post when not in use.

The tray illustrated in Fig. 3 may be also used inside the car on the seat by reversing the same and placing the legs 11 and 12 to the rear or back of the seat and the end 30 towards the front so that the tray will remain in a substantially horizontal position for the reason that the cushion of the automobile is usually higher at the front than it is near the back of the seat.

It will be obvious from the foregoing that I have provided an improved tray for attaching to the glass of the door of an automobile which may be used either on the inside or the outside of the car and the window raised or lowered as desired without interfering with the movement of the door of the automobile for the purpose desired.

What I claim and desire to secure by Letters Patent is:

A serving tray for detachable connection to automobile doors having a vertically movable window glass panel therein comprising, a wire tray of connected spaced wires defining a bottom and upwardly extending opposed sides and ends thereon, a one piece hanger member including spaced substantially parallel bars extending transversely of the tray bottom from adjacent one side thereof, said spaced bars being rigidly secured to the tray bottom and terminating in spaced relation to the other side thereof in downwardly inclined parallel portions ending in arms extending upwardly substantially perpendicularly relative to said bars and adjacent said other side of the tray, said arms terminating at their upper ends above the tray in downwardly and outwardly turned hook members for engaging the upper edge of the glass door panel, a tie bar connecting the outer ends of the hook members, and tie bars connecting the upper portions of the spaced arms for cooperation with the hook connecting tie bar and tray bottom for maintaining the spaced relation of the arms and hook members, said arms being of such length and extending above and below the tray whereby when the hook members are engaged over the upper edge of a partly raised glass door panel the arms have substantial engagement with the side of said glass panel adjacent the tray to support the tray for raising and lowering movement with said glass panel.

(References on following page)

References Cited in the file of this patent

UNITED STATES PATENTS

| | | |
|---|---|---|
| 1,630,889 | Clarke | May 31, 1927 |
| 1,899,480 | Ravlin | Feb. 28, 1933 |
| 1,964,500 | Breiding et al. | June 26, 1934 |
| 2,099,433 | Bloomfield | Nov. 16, 1937 |
| 2,179,273 | Ponten et al. | Nov. 7, 1939 |
| 2,672,988 | Johnson | Mar. 23, 1954 |
| 2,687,336 | Smith, et al. | Aug. 24, 1954 |
| 2,720,436 | Covey | Oct. 11, 1955 |